(12) United States Patent
Kurimoto et al.

(10) Patent No.: US 7,202,307 B2
(45) Date of Patent: Apr. 10, 2007

(54) EPDM COMPOSITION AND AUTOMOTIVE BRAKE SYSTEM RUBBER COMPONENT

(75) Inventors: Hidekazu Kurimoto, Aichi-ken (JP); Kiyomitsu Terashima, Aichi-ken (JP); Hidenori Hayashi, Aichi-ken (JP); Yasushi Nakahara, Aichi-ken (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 0 days.

(21) Appl. No.: 11/357,162

(22) Filed: Feb. 21, 2006

(65) Prior Publication Data

US 2006/0189741 A1    Aug. 24, 2006

(30) Foreign Application Priority Data

Feb. 21, 2005    (JP)    ............................. 2005-044202

(51) Int. Cl.
*C08C 19/00*    (2006.01)
*C08F 8/00*    (2006.01)

(52) U.S. Cl. ................................. 525/332.5; 525/331.8; 525/331.9; 525/332.6; 525/332.7; 525/349

(58) Field of Classification Search ............. 525/331.8, 525/331.9, 332.5, 332.6, 332.7, 349
See application file for complete search history.

(56) References Cited

U.S. PATENT DOCUMENTS 6,593,432 B1 *    7/2003    Ikemoto et al. .......... 525/331.8

FOREIGN PATENT DOCUMENTS

| EP | 1 074 583 A1 * | 2/2001 |
| JP | A-2001-106848 | 4/2001 |

* cited by examiner

*Primary Examiner*—Ling-Sui Choi
(74) *Attorney, Agent, or Firm*—Posz Law Group, PLC

(57) ABSTRACT

A sulfur curing system EPDM composition in which one or more types of vulcanization accelerators selected from thiazole type and sulfenamide type accelerators and one or more types of vulcanization accelerators selected from dithiocarbamate type and thiuram type accelerators are combined together so as to be compounded into the EPDM composition as a vulcanization accelerator, and an automotive brake system rubber component made of the EPDM composition.

6 Claims, No Drawings

EPDM COMPOSITION AND AUTOMOTIVE BRAKE SYSTEM RUBBER COMPONENT

BACKGROUND OF THE INVENTION

1. Field of the Invention

The present invention relates to an EPDM composition and an automotive brake system rubber component made of the EPDM composition.

2. Related Art

Ethylene-propylene rubber (EPM) or ethylene-propylene-non-conjugated diene rubber (EPDM) is widely used for automotive brake system components such as brake system hoses and seal components.

In the case of EPDM, a sulfur curing system EPDM is used and it is normal that a vulcanization accelerator and zinc while, which functions as a vulcanization accelerator assistant, are mixed into the EPDM.

Incidentally, a brake system hose is mounted to be connected to a metallic pipe to which copper plating is applied. On the other hand, part of the vulcanization accelerator is eluted into a brake fluid depending upon the type and amount of the vulcanization accelerator into which rubber is compounded. A substance eluted from the vulcanization accelerator reacts with the copper plating, and then, the copper plating is stripped from the metallic pipe or a reaction product resulting from the reaction between the eluted substance and the copper plating settles in the brake fluid.

Due to this, it is considered to use peroxide curing system EPM compositions and EPDM compositions which contain no vulcanization accelerator. In consideration of the adhesive property thereof to fabric making up a reinforcement layer and the durability thereof which is one of product performances, however, those peroxide curing system EPM and EPDM compositions are not suitable for brake system hoses.

In addition, the elution of rubber compound is also found in a radiator hose which is made of a sulfur curing system EPDM composition, and this is coped with by dealing properly with types and amounts of vulcanization accelerators that are to be compounded (refer to JP-A-2001-106848). However, even when the EPDM composition has been applied to brake system hoses, no sufficient effectiveness has been obtained yet.

SUMMARY OF THE INVENTION

The invention was made to cope with the stripping of the copper plating from the metallic pipe or sedimentation in the brake fluid of the reaction product resulting from the reaction between the eluted substance from the EPDM and the copper plating and an object thereof is to provide a sulfur curing system EPDM composition which prevents the aforesaid separation or sedimentation and an automotive brake system rubber component which utilizes the EPDM composition.

With a view to attaining the object, according to the invention, there is provided a sulfur curing system EPDM composition containing at least a vulcanization accelerator and zinc wherein one or more types of vulcanization accelerators selected from thiazole type and sulfenamide type accelerators and one or more types of vulcanization accelerators selected from dithiocarbamate type and thiuram type accelerators are combined together so as to be compounded into the EPDM composition as the vulcanization accelerator.

According to the invention, a total amount of the vulcanization accelerator compounded into the EPDM composition is less than a maximum of 2.0 parts by weight per 100 parts by weight of EPDM, a total amount of the one or more types of vulcanization accelerators selected from thiazole type and sulfenamide type accelerators compounded as the vulcanization accelerator is a maximum of 1.3 parts by weight, and a compounding ratio of the one or more types of vulcanization accelerators selected from thiazole type and sulfenamide type accelerators and the one or more types of vulcanization accelerators selected from dithiocarbamate type and thiuram type accelerators is in a range from 1:0.05 to 1:0.5.

According to the invention, there is provided an automotive brake system rubber component utilizing the aforesaid EPDM composition.

[Thiazole Type Vulcanization Accelerator]

Raised as the thiazole type vulcanization accelerator are 2-mercaptobenzothiazole, dibenzothiazyl disulfide, and zinc salt of 2-mercaptobenzothiazole.

[Sulfenamide Type Vulcanization Accelerator]

Raised as the sulfenamide type vulcanization accelerator are N-cyclohexyl-2-benzothiazolylsulfenamide, and N,N-dicyclohexyl-2-benzothiazolylsulfenamide.

[Dithiocarbamate Type Vulcanization Accelerator]

Raised as the dithiocarbamate type vulcanization accelerator are zinc dibutyl dithiocarbamate and zinc N-ethyl-N-phenyldithiocarbamate.

[Thiuram Type Vulcanization Accelerator]

Raised as the thiuram type vulcanization accelerator are tetramethylthiuram disulfide, tetramethylthiuram monosulfide, and dipentamethylenethiuram tetrasulfide.

[Combination and Compounded Amount of Vulcanization Accelerators]

The use of thiazole type vulcanization accelerators and sulfenamide type vulcanization accelerators reduces the reaction property with copper to thereby reduce, in turn, the stripping of the copper plating from the metallic pipe and the sedimentation of the reaction product in brake fluid. However, since the vulcanization speed of EPDM compounded only of these vulcanization accelerators is slow, the aforesaid composition cannot be put to practical use.

Due to this, a practical composition can be attained by combining dithiocarbamate type and thiuram type vulcanization accelerators, which have high reaction property with copper and fast vulcanization speed, with thiazole type and sulfenamide type vulcanization accelerators. A total amount of the vulcanization accelerates so compounded is made to be less than a maximum of 2.0 parts by weight, and a compounding ratio is attained in which the thiazole type and sulfenamide type vulcanization accelerators become dominant in volume.

[Automotive Brake System Rubber Components]

Automotive brake system rubber components denote rubber components which are brought into contact with brake fluid, and brake system hoses (brake hoses, brake fluid reservoir hoses) and seal components (piston cups, piston seals) can be raised as examples of the automotive brake system rubber components.

The use of the vulcanization accelerators having the low copper reaction property and compounding of smaller amounts of the vulcanization accelerators having the high copper reaction property can realize the reduction in occurrence of stripping of copper plating and in production of the sediment which is the reaction product between copper plating and the vulcanization accelerators.

DETAILED DESCRIPTION OF THE PREFERRED EMBODIMENTS

According to a preferred aspect of the invention, a thiazole type vulcanization accelerator may be combined with a dithiocarbamate type vulcanization accelerator, or a sulfenamide type vulcanization accelerator may be combined with a thiazole type vulcanization accelerator and a dithiocarbamate type vulcanization accelerator, or a thiazole type vulcanization accelerator may be combined with a thiuram type vulcanization accelerator. A total amount of vulcanization accelerators compounded is less than a maximum of 2.0 parts by weight, preferably in a range from 1.3 to less than 2.0 parts by weight. A total amount of the thiazole type vulcanization accelerator or/and the sulfenamide type vulcanization accelerator which are compounded is a maximum of 1.3 parts by weight, preferably in a range from 0.8 to 1.3 parts by weight.

In addition, a compounding ratio of the thiazole type vulcanization accelerator (or/and the sulfenamide type vulcanization accelerator) and the dithiocarbamate type vulcanization accelerator (or the thiuram type vulcanization accelerator) is in a range from 1:0.05 to 1:0.5, preferably in a range from 1:0.1 to 0.5.

EXAMPLES

An EPDM composition formulated as in Table-1 was steam vulcanized at 150° C. for 30 minutes to mold a brake hose for use in a test. (The EPDM composition was used as an inner tubular material of the hose, and another EPDM composition formulated in another way was used as an outer tubular material for the hose.)

The concentration of copper in a brake fluid was used as an evaluation item.

[Test Method]

A brake hose (1 m) in which a brake fluid is sealed is to be left to stand at 100° C. for 24 hours, and thereafter, the brake fluid is to be put in a glass bottle containing a copper foil (15 mm×20 mm×0.04 mm, produced by The Nilaco Corporation). The glass bottle is then to be left to stand at 70° C. for 24 hours. Thereafter, a supernatant liquid is to be sampled, and the copper concentration in the supernatant liquid so sampled is to be measured.

Note that a brake fluid of DOT4 was used.

[Copper Concentration Measuring Method]

The copper concentration was measured using the atomic absorption spectroscopy.

The results of the test carried out to the test method described above are shown in Table-2. The results showed that the reaction property of the sulfur crosslinking vulcanization accelerators which were eluted with the brake fluid with copper was low and that the copper concentration was low.

TABLE 1

| Compositions | Compounded Amounts (in parts by weight) |
|---|---|
| EPDM (JSR:EP33) | 100 |
| Carbon Black | 50 |
| Active Zinc While | 3 |
| Stearic Acid | 1 |
| Organic Vulcanization Accelerator | 1 |
| Sulfur | 0.7 |
| Thiazole Type Vulcanization Accelerator | Variable |
| Dithiocarbamate Type Vulcanization Accelerator | Variable |
| Thiuram Type Vulcanization Accelerator | Variable |

TABLE 2

| | | Vulcanization Accelerators (in parts by weight) | Copper Concentration in Brake Fluid (ppm) |
|---|---|---|---|
| Examples | 1 | DM/M/BZ = 0.8/0.5/0.3 | 32 |
| | 2 | MZ/DM/BZ = 0.5/0.5/0.5 | 60 |
| | 3 | MZ/M/BZ = 0.8/0.5/0.3 | 38 |
| | 4 | CZ/M/BZ = 0.5/0.5/0.5 | 51 |
| | 5 | MZ/TRA = 1.3/0.2 | 34 |
| Comparative Examples | 6 | DM/M/BZ = 0.5/0.5/0.8 | 231 |
| | 7 | DM/BZ = 0.6/0.7 | 119 |
| | 8 | MZ/PX = 0.5/0.4 | 209 |

Thiazole type vulcanization accelerator:

DM (Nocceler DM), M (Nocceler M), MZ (Nocceler MZ)

Sulfenamide type vulcanization accelerator:

CZ (Nocceler CZ)

Dithiocarbamate type vulcanization accelerator:

BZ (Nocceler BZ), PX (Nocceler PX)

Thiuram type vulcanization accelerator:

TRA (Nocceler TRA)

What is claimed is:

1. A sulfur curing EPDM composition comprising:
   100 parts by weight of EPDM;
   zinc; and
   a vulcanization accelerator including sulfenamide type, thiazole type and dithiocarbamate type accelerators in an amount effective for vulcanizing the composition up to less than 2.0 parts by weight per the 100 parts by weight of EPDM; the sulfenamide type, thiazole type and dithiocarbamate type accelerators being combined together and compounded into the EPDM,
   wherein the thiazole type and sulfenamide type accelerators are contained in a combined amount up to 1.3 parts by weight per the 100 parts by weight of EPDM, and
   wherein a ratio of the thiazole type and sulfenamide type accelerators to the dithiocarbamate type accelerator is in a range from 1:0.05 to 1:0.5.

2. The sulfur curing EPDM composition according to claim 1, wherein a total amount of the vulcanization accelerators compounded is in a range from 1.3 to less than 2.0 parts by weight per the 100 parts by weight of EPDM.

3. An automotive brake system rubber component utilizing the sulfur curing EPDM composition according to claim 1.

4. In a sulfur curing EPDM composition, which comprises 100 parts by weight of EPDM and zinc, the improvement comprising:
   a vulcanization accelerator including sulfenamide type, thiazole type and dithiocarbamate type accelerators in an amount effective for vulcanizing the composition up to less than 2.0 parts by weight per the 100 parts by weight of EPDM; the sulfenamide type, thiazole type and dithiocarbamate type accelerators being combined together and compounded into the EPDM, wherein the thiazole type and sulfenamide type accelerators are contained in a combined amount up to 1.3 parts by weight per the 100 parts by weight of EPDM, and wherein a ratio of the thiazole type and sulfenamide type accelerators to the dithiocarbamate type accelerator is in a range from 1:0.05 to 1:0.5.

5. The sulfur curing EPDM composition according to claim 4, wherein a total amount of the vulcanization accelerators compounded is in a range from 0.84 to less than 2.0 parts by weight per the 100 parts by weight of EPDM.

6. An automotive brake system rubber component utilizing the sulfur curing EPDM composition according to claim 4.

* * * * *